US009071307B2

(12) United States Patent
Nakamura et al.

(10) Patent No.: US 9,071,307 B2
(45) Date of Patent: Jun. 30, 2015

(54) WIRELESS COMMUNICATION SYSTEM, WIRELESS COMMUNICATION APPARATUS, PROGRAM AND TRANSMISSION METHOD

(75) Inventors: Osamu Nakamura, Osaka (JP); Hiroki Takahashi, Osaka (JP); Jungo Goto, Osaka (JP); Kazunari Yokomakura, Osaka (JP); Yasuhiro Hamaguchi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 13/640,925

(22) PCT Filed: Apr. 14, 2011

(86) PCT No.: PCT/JP2011/059286
§ 371 (c)(1),
(2), (4) Date: Oct. 12, 2012

(87) PCT Pub. No.: WO2011/129403
PCT Pub. Date: Oct. 20, 2011

(65) Prior Publication Data
US 2013/0028226 A1    Jan. 31, 2013

(30) Foreign Application Priority Data

Apr. 15, 2010    (JP) ................. 2010-094037

(51) Int. Cl.
*H04W 4/00*    (2009.01)
*H04B 7/04*    (2006.01)
*H04L 5/00*    (2006.01)
*H04L 25/03*    (2006.01)
*H04B 7/06*    (2006.01)

(52) U.S. Cl.
CPC ............ *H04B 7/0486* (2013.01); *H04L 5/0023* (2013.01); *H04L 5/0048* (2013.01); *H04L 25/03891* (2013.01); *H04B 7/0669* (2013.01)

(58) Field of Classification Search
CPC ............ H04J 1/04; H04J 1/06; H04L 5/0023; H04L 25/0202; H04B 7/0486; H04B 7/0669; H04B 7/0413
USPC .................................................. 370/329, 330
See application file for complete search history.

(56) References Cited

U.S. PATENT DOCUMENTS

| | | | |
|---|---|---|---|
| 2007/0202818 A1* | 8/2007 | Okamoto ...................... 455/101 |
| 2008/0056414 A1* | 3/2008 | Kim et al. ...................... 375/347 |
| 2009/0213955 A1* | 8/2009 | Higuchi et al. ............... 375/267 |
| 2010/0046445 A1 | 2/2010 | Sawahashi et al. |
| 2011/0212743 A1 | 9/2011 | Yokomakura et al. |

FOREIGN PATENT DOCUMENTS

| | | |
|---|---|---|
| JP | 2008-79262 A | 4/2008 |
| WO | WO 2009/022709 A1 | 2/2009 |

* cited by examiner

*Primary Examiner* — Peter Cheng
(74) *Attorney, Agent, or Firm* — Birch, Stewart, Kolasch & Birch, LLP

(57) ABSTRACT

A wireless communication system includes a first wireless communication apparatus, which includes a plurality of transmission antennas and transmits signals in an MIMO scheme, and a second wireless communication apparatus, which receives the signals. The first wireless communication apparatus performs the same frequency allocation for transmission antennas from which the same data is transmitted in case that transmission is performed in a rank less than the number of transmission antennas.

11 Claims, 15 Drawing Sheets

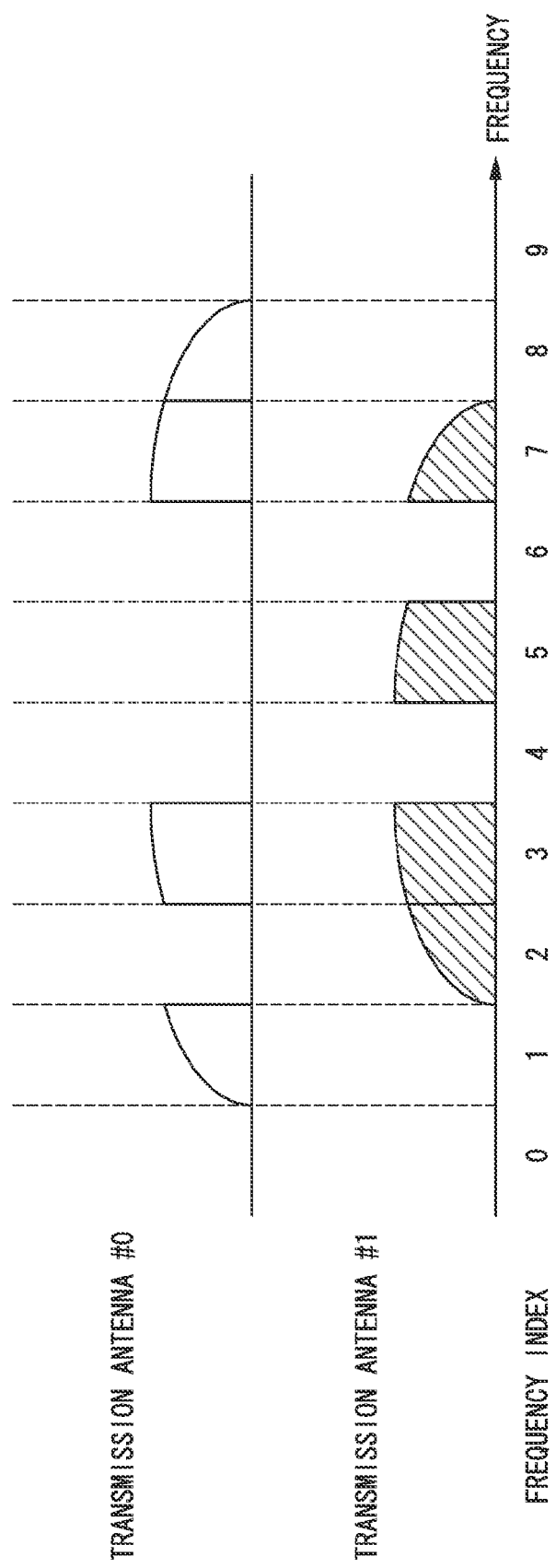

WIRELESS COMMUNICATION SYSTEM, WIRELESS COMMUNICATION APPARATUS, PROGRAM AND TRANSMISSION METHOD

TECHNICAL FIELD

The present invention relates to a wireless communication system, a wireless communication apparatus, a program, and a transmission method.

This application is based upon and claims the benefit of priority from Japanese Patent Application No. 2010-094037, filed Apr. 15, 2010, the entire contents of which are incorporated herein.

BACKGROUND ART

In Long Term Evolution (LTE), which is a wireless communication standard of $3^{rd}$ Generation Partnership Project (3GPP) or LTE-Advanced (LTE-A), which is an evolution of LTE, orthogonal frequency division multiple access (OFDMA), which is strongly robust to a frequency-selective channel and highly compatible with multiple input multiple output (MIMO) transmission, has been adopted as a transmission scheme in downlink (DL) (communication from a base station to a mobile station).

On the other hand, in uplink (UL) (communication from the mobile station to the base station), the cost and scale of a terminal (mobile station or mobile terminal) are important. However, multi-carrier transmission of orthogonal frequency division multiplexing (OFDM) or the like is not suited for UL transmission because a peak to average power ratio (PAPR) of a transmission signal is high and a power amplifier having a wide linear region is necessary. That is, single-carrier transmission having a low PAPR is desirable to maintain wide coverage in UL, and single-carrier frequency division multiple access (SC-FDMA) (also referred to as discrete Fourier transform spread OFDM (DFT-S-OFDM)) is adopted in UL of LTE.

In LTE-A, clustered DFT-S-OFDM is determined to be adopted in addition to SC-FDMA as an access scheme of UL so as to achieve greater system throughput than that of LTE. In clustered DFT-S-OFDM (hereinafter referred to as "clustered"), a frequency spectrum continuously arranged in SC-FDMA can be divided and non-continuously arranged. Because the non-continuous arrangement is acceptable, the improvement of frequency utilization efficiency by the active use of a frequency having a high gain that is non-continuously present or the improvement of availability of a system frequency by flexibility of frequency scheduling in the base station is expected.

However, the clustered scheme has a problem in that the PAPR is deteriorated as compared to SC-FDMA. Here, because a user near the base station can satisfy the quality of reception in the base station at low power, the linearity of an amplifier of the mobile terminal is not particularly problematic. Accordingly, a user close to the base station performs transmission using clustered DFT-S-OFDM and a user far from the base station performs transmission using SC-FDMA, so that it is possible to achieve high system throughput while coverage is maintained.

In addition, recently, even in MIMO in which transmission is performed using multiple antennas of a transceiver, single-user MIMO in which independent data is transmitted from multiple antennas provided in the mobile terminal at the same time and the same frequency is drawing attention as technology for improving a peak data rate of a user. In single-user MIMO, spatial filtering such as a minimum mean square error (MMSE), maximum likelihood detection (MLD), or the like is applied to a receiver, so that the separation of data is possible. In addition, it is possible to improve frequency utilization efficiency together using the MIMO transmission and the clustered scheme.

Incidentally, in LTE-A, frequency allocations of antennas of a transmitter are the same when MIMO is applied to the clustered scheme. However, a frequency having a high gain is different for every transmission antenna. Accordingly, as in FIG. 17, transmission having higher frequency utilization efficiency is possible by permitting different frequency allocation for every antenna as disclosed in Patent Document 1.

RELATED ART DOCUMENT

Patent Document

Patent Document 1: PCT International Publication No. WO 2009/022709

DISCLOSURE OF INVENTION

Problem to be Solved by the Invention

In the MIMO transmission, the transmission of R independent data symbols (hereinafter also referred to as layers or streams) from $N_t$ transmission antennas provided in a terminal is referred to as the transmission of rank R. Patent Document 1 is aimed at full rank ($R=N_t$) in which $N_t$ different data is transmitted from the $N_t$ antennas provided in the terminal, which is a transmitter. However, it is desirable for a terminal of a cell edge to apply transmission diversity for improving the quality of reception by transmitting the same data from multiple antennas and improve the quality of reception in a base station. That is, transmission of $R<N_t$ rather than full rank is performed.

Here, if the transmission diversity is directly applied to Patent Document 1, that is, if the same data is transmitted using different frequency allocations, there is a problem in that interference between transmission antennas occurs and transmission efficiency is low. For example, as in FIG. 17, if the same data is transmitted from transmission antennas #0 and #1 using different frequency allocations, the receiver, which is the base station, can perform reception without interference between the antennas because the same frequency spectrum is transmitted from transmission antennas #0 and #1 in frequency index 3. However, because different frequency spectra are transmitted in frequency index 7, the frequency spectra interfere with each other.

Here, the different frequency spectra can be separated by a reception process of MMSE filtering, MLD, or the like in the receiver. After the frequency spectrum separation, spectra transmitted at different frequencies may also be subjected to antenna combining. However, because interference remains in MMSE or MLD, there is a problem in that transmission performances are deteriorated.

The present invention has been made in view of the above-described circumstances, and an object of the invention is to provide a wireless communication system, a wireless communication apparatus, a program, and a transmission method capable of suppressing interference between transmission antennas and performing good transmission.

Means to Solve the Problem (1) The present invention was made to solve the above-described problem, first aspect of the present invention is a wireless communication system including a first wireless communication apparatus, which includes a plurality of transmission antennas and transmits signals in an MIMO scheme, and a second wireless communication apparatus, which receives the signals, wherein the first wireless communication apparatus performs the same frequency allocation for transmission antennas from which the same data is transmitted in case that transmission is performed in a rank less than the number of transmission antennas.

(2) In the first aspect of the present invention, the second wireless communication apparatus may include an allocation information generation section configured to determine the frequency allocation.

(3) In the first aspect of the present invention, the allocation information generation section may determine frequency allocations, the number of which is the same as the number of ranks.

(4) In the first aspect of the present invention, the second wireless communication apparatus may include a channel estimation section configured to estimate a channel from the transmission antenna, and the allocation information generation section may determine the frequency allocation based on an estimation result by the channel estimation section.

(5) Second aspect of the present invention is a wireless communication apparatus, which includes a plurality of transmission antennas and transmits signals in an MIMO scheme, wherein the same frequency allocation is performed for transmission antennas from which the same data is transmitted in case that transmission is performed in a rank less than the number of transmission antennas.

(6) Third aspect of the present invention is a wireless communication apparatus which receives signals from another wireless communication apparatus, which includes a plurality of transmission antennas and transmits the signals in an MIMO scheme, including: an allocation information generation section configured to determine frequency allocation so that the same frequency allocation is performed for transmission antennas from which the same data is transmitted in case that the other wireless communication apparatus performs transmission in a rank less than the number of transmission antennas.

(7) Fourth aspect of the present invention is a program for causing a computer of a wireless communication apparatus which receives signals from another wireless communication apparatus, which includes a plurality of transmission antennas and transmits the signals in an MIMO scheme, to function as: an allocation information generation section configured to determine frequency allocation so that the same frequency allocation is performed for transmission antennas from which the same data is transmitted in case that the other wireless communication apparatus performs transmission in a rank less than the number of transmission antennas.

(8) Fifth aspect of the present invention is a transmission method for use in a wireless communication system including a first wireless communication apparatus, which includes a plurality of transmission antennas and transmits signals in an MIMO scheme, and a second wireless communication apparatus, which receives the signals, including: performing, by the first wireless communication apparatus, the same frequency allocation for transmission antennas from which the same data is transmitted in case that transmission is performed in a rank less than the number of transmission antennas.

Effect of the Invention

According to the present invention, it is possible to suppress interference between transmission antennas and perform good transmission.

BRIEF DESCRIPTION OF THE DRAWINGS

FIG. 17 is a diagram illustrating an example of different frequency allocation for every antenna in the related art.

BEST MODE FOR CARRYING OUT THE INVENTION

First Embodiment

Figure 1:
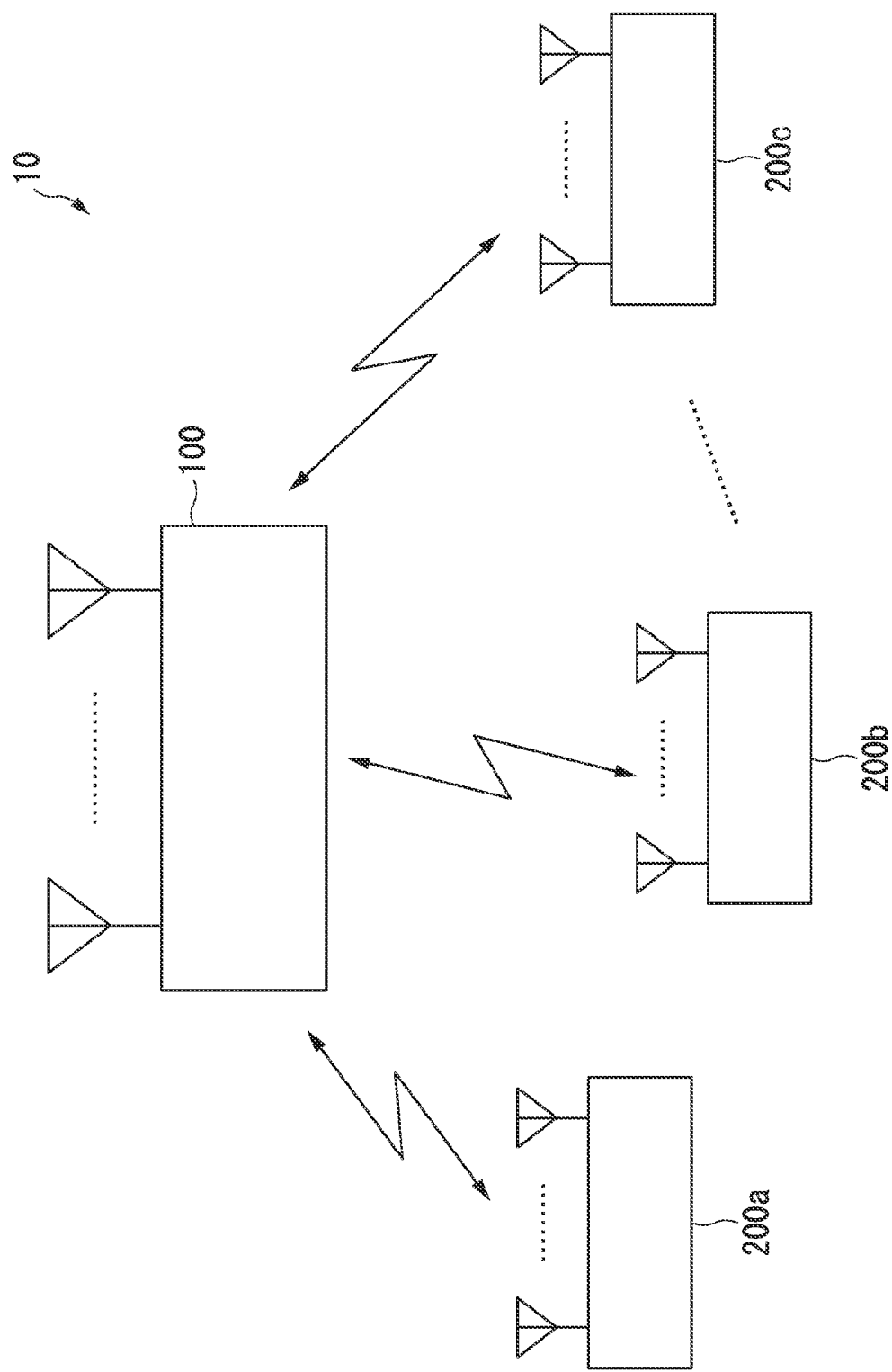
FIG. 1 is a schematic block diagram illustrating a configuration of a wireless communication system in accordance with a first embodiment of the present invention.

Hereinafter, the first embodiment of the present invention will be described with reference to the drawings. In the first embodiment, the case in which multiple transmission antennas are provided and signals are transmitted in an MIMO scheme in single-carrier transmission in which precoding is performed during transmission will be described. FIG. 1 is a schematic block diagram illustrating a configuration of a wireless communication system in accordance with this embodiment. In accordance with this embodiment, the wireless communication system 10 includes a base station apparatus 100 and mobile station apparatuses 200a, 200b, 200c. The base station apparatus 100 wirelessly communicates with the mobile station apparatuses 200a, 200b, . . . , 200c. As described above, a clustered DFT-S-OFDM scheme is used for UL, which is communication from the mobile station apparatuses 200a, 200b, . . . , 200c (first wireless communication apparatuses) to the base station apparatus 100 (a second wireless communication apparatus). In addition, for example, a communication scheme in which multi-access is possible such as OFDMA is used for DL, which is communication from the base station apparatus 100 to the mobile station apparatuses 200a, 200b, . . . , 200c.

Figure 2:
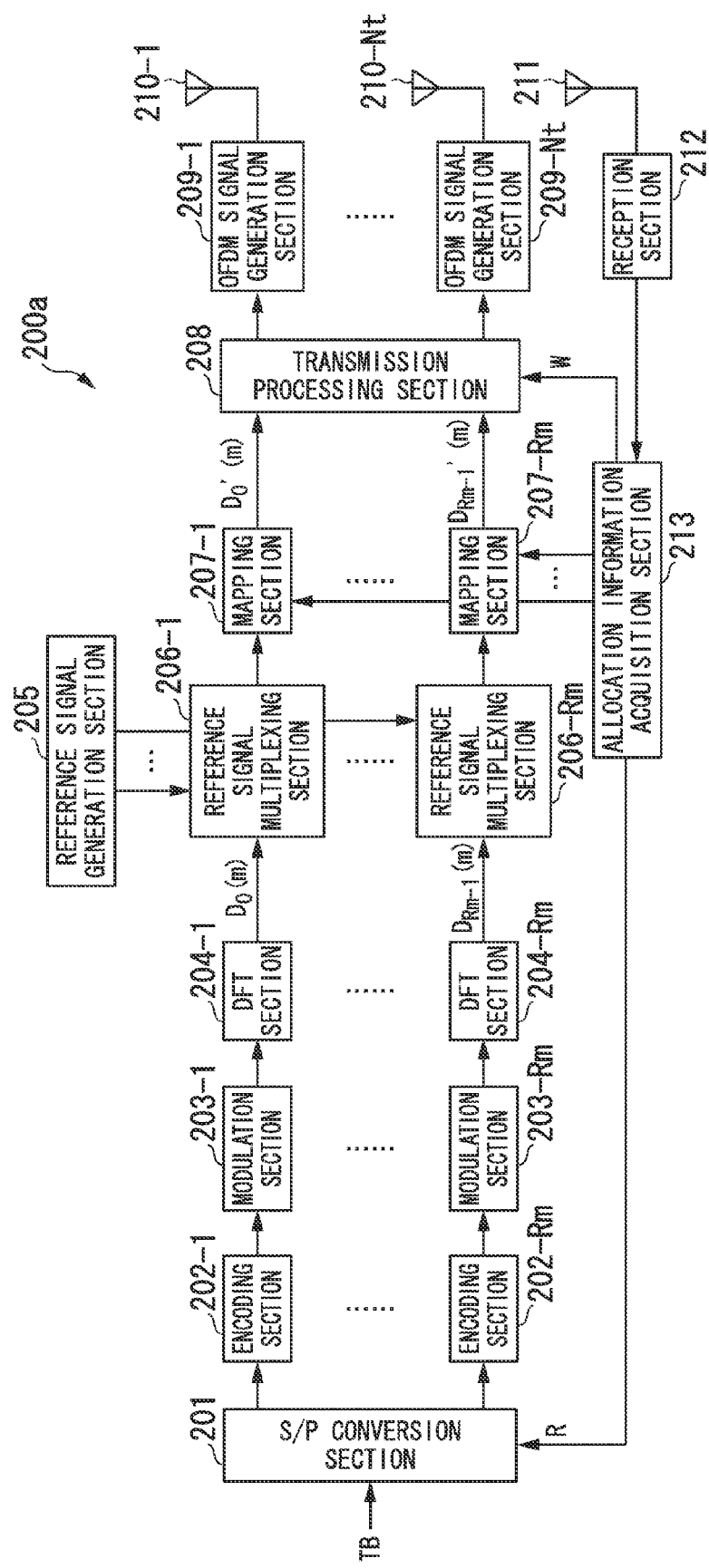
FIG. 2 is a schematic block diagram illustrating a configuration of a mobile station apparatus 200a in accordance with the same embodiment.

FIG. 2 is a schematic block diagram illustrating a configuration of the mobile station apparatus 200a in accordance with the same embodiment. Because the other mobile station apparatuses 200b, . . . , 200c have the same configuration as the mobile station apparatus 200a, description thereof is omitted. For the mobile station apparatus 200a, the number of transmission antennas is $N_t$ and a maximum number of ranks is R. In precoding for a signal to be transmitted, there are cubic metric preserving (CMP), which does not increase absolutely low peak power by forbidding signal addition in each transmission antenna, and cubic metric friendly (CMF), which obtains an array gain by permitting signal addition in each antenna. Although the present invention is applicable even in CMF, an example of CMP will be described in this embodiment.

In addition, although a non-continuous arrangement of frequencies is configured to be permitted in all antennas, a continuous arrangement of frequencies may be applied to at least one antenna. In addition, although an example in which the mobile station apparatus 200a performs transmission in the clustered DFT-S OFDM (clustered) scheme will be described, single-carrier transmission such as SC-FDMA (DFT-S-OFDM) or multi-carrier transmission such as OFDM or multi-carrier code division multiple access (MC-CDMA) may be performed. In addition, although an example of UL will be described, the present invention is also applicable to DL.

The mobile station apparatus 200a includes a serial-to-parallel (S/P) conversion section 201, encoding sections 202-1 to 202-$R_m$, modulation sections 203-1 to 203-$R_m$, DFT sections 204-1 to 204-$R_m$, a reference signal generation section 205, reference signal multiplexing sections 206-1 to 206-$R_m$, mapping sections 207-1 to 207-$R_m$, a transmission processing section 208, OFDM signal generation sections 209-1 to 209-$N_t$, transmission antennas 210-1 to 210-$N_t$, a reception antenna 211, a reception section 212, and an allocation information acquisition section 213.

The S/P conversion section 201 converts a transmission bit sequence TB into layers, the number of which is the number of ranks, R, designated from the allocation information acquisition section 213 according to S/P conversion. Outputs of the S/P conversion section 201 are input to the encoding sections 202-1 to 202-$R_m$ for every layer. When the number of layers, R, is less than the maximum number of ranks, $R_m$, the outputs of the S/P conversion section 201 are input to encoding sections for the number of layers, R, that is, the encoding sections 202-1 to 202-R, without being input to the remaining encoding sections.

In addition, although the outputs of the S/P conversion section 201 are configured to be input to the encoding sections 202-1 to 202-$R_m$ in FIG. 2, a reverse configuration (S/P conversion after one encoding section) may be used. Among the encoding sections 202-1 to 202-$R_m$, the encoding sections 202-1 to 202-R to which the outputs of the S/P conversion section 201 are input perform error-correction encoding of input bit sequences. The encoding sections 202-1 to 202-R input the error-correction encoded bit sequences to the corresponding modulation sections 203-1 to 203-R, respectively. The modulation sections 203-1 to 203-R convert the error-correction encoded bit sequences into modulation symbols according to quadrature phase shift keying (QPSK), 16 quadrature amplitude modulation (16QAM), or the like.

The outputs of the modulation sections 203-1 to 203-R are input to the corresponding DFT sections 204-1 to 204-R for every $N_{DFT}$ symbols, respectively. The DFT sections 204-1 to 204-R perform transforms from time-domain signals into frequency-domain signals by transforming modulation symbols of the $N_{DFT}$ symbols according to $N_{DFT}$-point DFTs. Here, the frequency-domain signal generated by the DFT section 204-$i$ is denoted by $D_{i-1}(m)$ ($0 \leq m \leq N_{DFT}-1$). Further, the frequency-domain signals generated by the DFT sections 204-1 to 204-R are collectively denoted by $D(m) = [D_0(m), \ldots, D_{R-1}(m)]^T$ ($0 \leq m \leq N_{DFT}-1$). Here, T denotes a matrix transposition process.

The outputs of the DFT sections 204-1 to 204-R are input as data signals to the corresponding reference signal multiplexing sections 206-1 to 206-R. The reference signal multiplexing sections 206-1 to 206-R multiplex the data signals with reference signals input from the reference signal generation section 205 in frequency. However, although the reference signals are configured to be multiplexed after DFT in FIG. 2, time-domain data signals may be configured to be multiplexed. The reference signal generation section 205 generates a reference signal (demodulation reference signal (DMRS)) including a sequence from which a channel between each layer and the reception antenna of the base station apparatus 100 can be estimated among known reference signals in the base station apparatus 100. Although a code, which does not increase peak power during conversion of Zadoff-Chu sequence or the like into the time domain, is usually used for a sequence to be allocated to a subcarrier, the present invention is not limited thereto. In addition, a reference signal of each layer may be orthogonalized by assigning a different cyclic shift to the reference signal of each layer, and any method such as a method of multiplying a sequence using an orthogonal cover code (OCC) or a subcarrier arrangement based on interleaved frequency division multiplexing (IFDM) may be used.

Outputs of the reference signal multiplexing sections 206-1 to 206-R are input to the corresponding mapping sections 207-1 to 207-R, respectively. The mapping sections 207-1 to 207-R allocate data signals and reference signals to predetermined $N_{DFT}$-point frequencies among $N_{FFT}$-point frequencies according to frequency allocation information of corresponding layers acquired by the allocation information acquisition section 213. Zero is allocated to unallocated ($N_{FFT}-N_{DFT}$)-point frequencies. The allocation information acquisition section 213 outputs frequency allocation information of layers to the corresponding mapping sections 207-1 to 207-R$_m$, outputs the number of ranks, R, to the S/P conversion section 201, and outputs information (a precoding matrix index (PMI)) W designating a precoding matrix to be described later to the transmission processing section 208. Although the information is configured to be reported as a control signal from the base station apparatus 100, which is a reception side in this embodiment, the information may be determined in the mobile station apparatus 200a, which is a transmission side.

Here, an output signal of the mapping section 207-i is denoted by D$_{i-1}$'(k) (0≤m≤N$_{FFT}$−1). Further, output signals of the mapping sections 207-1 to 207-R$_m$ are collectively denoted by D'(k)=[D$_0$'(k), . . . , D$_{R-1}$'(k)]$^T$ (0≤k≤N$_{FFT}$−1). An N$_{FFT}$-point output vector D'(k)=[D$_0$'(k), . . . , D$_{R-1}$'(k)]$^T$ (0≤k≤N$_{FFT}$−1) is input to the transmission processing section 208. The transmission processing section 208 performs precoding by a transmission weight matrix (precoding matrix) on the N$_{FFT}$-point output vector D'(k).

Figure 3:
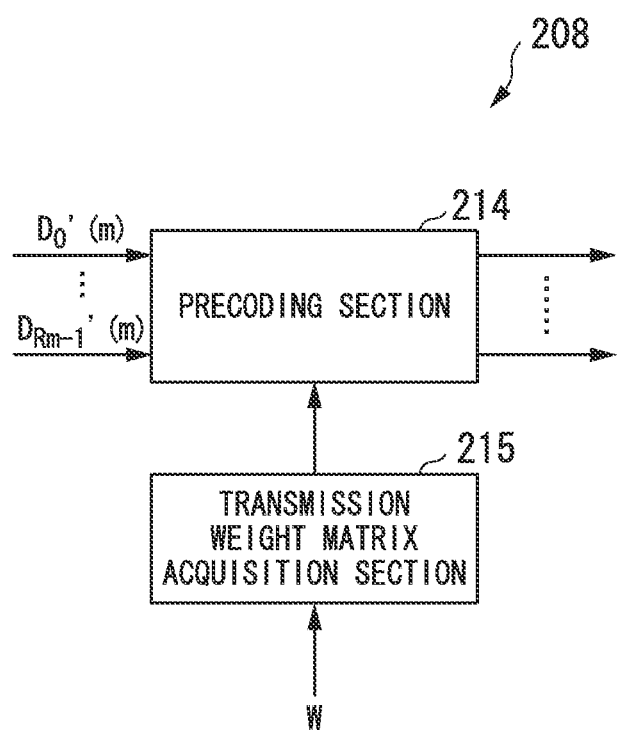
FIG. 3 is a schematic block diagram illustrating a configuration of a transmission processing section 208 in accordance with the same embodiment.

FIG. 3 is a schematic block diagram illustrating a configuration of the transmission processing section 208 in accordance with this embodiment. The transmission processing section 208 includes a precoding section 214 and a transmission weight matrix acquisition section 215. The transmission weight matrix acquisition section 215 receives information W (PMI) from the allocation information acquisition section 213, and outputs a precoding matrix index w corresponding to the information W from among precoding matrices of a codebook. The transmission weight matrix acquisition section 215 may store the precoding matrix w corresponding to each piece of the information W in advance. As will be described later, the precoding matrix w may be calculated by setting the information W as a parameter.

The precoding section 214 performs precoding by a transmission weight matrix (precoding matrix) output by the transmission weight matrix acquisition section 215 on N$_{FFT}$-point vectors D'(k) input from the mapping sections 207-1 to 207-R. That is, the input vector D'(k) is multiplied by the precoding matrix w. Here, w is an (N$_t$×R) matrix. Although the case in which the same precoding is performed at all frequencies has been described in this embodiment, different precoding may be performed for every frequency because an optimum precoding matrix is different for every frequency. A vector S(k) (0≤k≤N$_{FFT}$−1) output by the precoding section 214 is expressed by Expression (1).

$$S(k) = wD'(k)$$
$$= \begin{bmatrix} w_{0,0} & w_{0,1} & \cdots & w_{0,R-1} \\ w_{1,0} & w_{1,1} & \cdots & w_{1,R-1} \\ \vdots & \vdots & \ddots & \vdots \\ w_{Nt-1,0} & w_{Nt-1,1} & \cdots & w_{Nt-1,R-1} \end{bmatrix}$$
$$\begin{bmatrix} D'_0(k) \\ D'_1(k) \\ \vdots \\ D'_{R-1}(k) \end{bmatrix}$$
$$= [S_0(k) \quad S_1(k) \quad \cdots \quad S_{Nt-1}(k)]^T$$
(1)

Although the mobile station apparatus 200a (FIG. 2) in accordance with this embodiment performs precoding in the frequency domain, the precoding may be configured to be performed in the time domain.

Returning to FIG. 2, signals S$_0$(k) to S$_{Nt-1}$(k) for first to N$_t^{th}$ transmission antennas output by the transmission processing section 208 are input to the corresponding OFDM signal generation sections among the OFDM signal generation sections 209-1 to 209-N$_t$, respectively. The OFDM signal generation sections 209-1 to 209-N$_t$ apply N$_{FFT}$-point inverse fast Fourier transforms (IFFTs) to the input signals, and transform the signals from frequency-domain signals into time-domain signals (clustered symbols). In addition, the OFDM signal generation sections 209-1 to 209-N$_t$ each multiplex the input signals with reference signals (sounding reference signals (SRSs)) including sequences from which channels between the transmission antennas 210-1 to 210-N$_t$ and the reception antenna of the base station apparatus 100 can each be estimated among known reference signals in the base station apparatus 100. The multiplexing of the reference signals (SRSs) may be performed on frequency-domain signals and time-domain signals (clustered symbols). Further, the OFDM signal generation sections 209-1 to 209-N$_t$ insert cyclic prefixes (CPs) into the clustered symbols. The OFDM signal generation sections 209-1 to 209-N$_t$ perform digital-to-analog (D/A) conversion on the clustered symbols after the CP insertion. After up-conversion from basebands into carrier frequencies or the like is performed, the clustered symbols are transmitted from corresponding transmission antennas 210-1 to 210-N$_t$.

Figure 4:
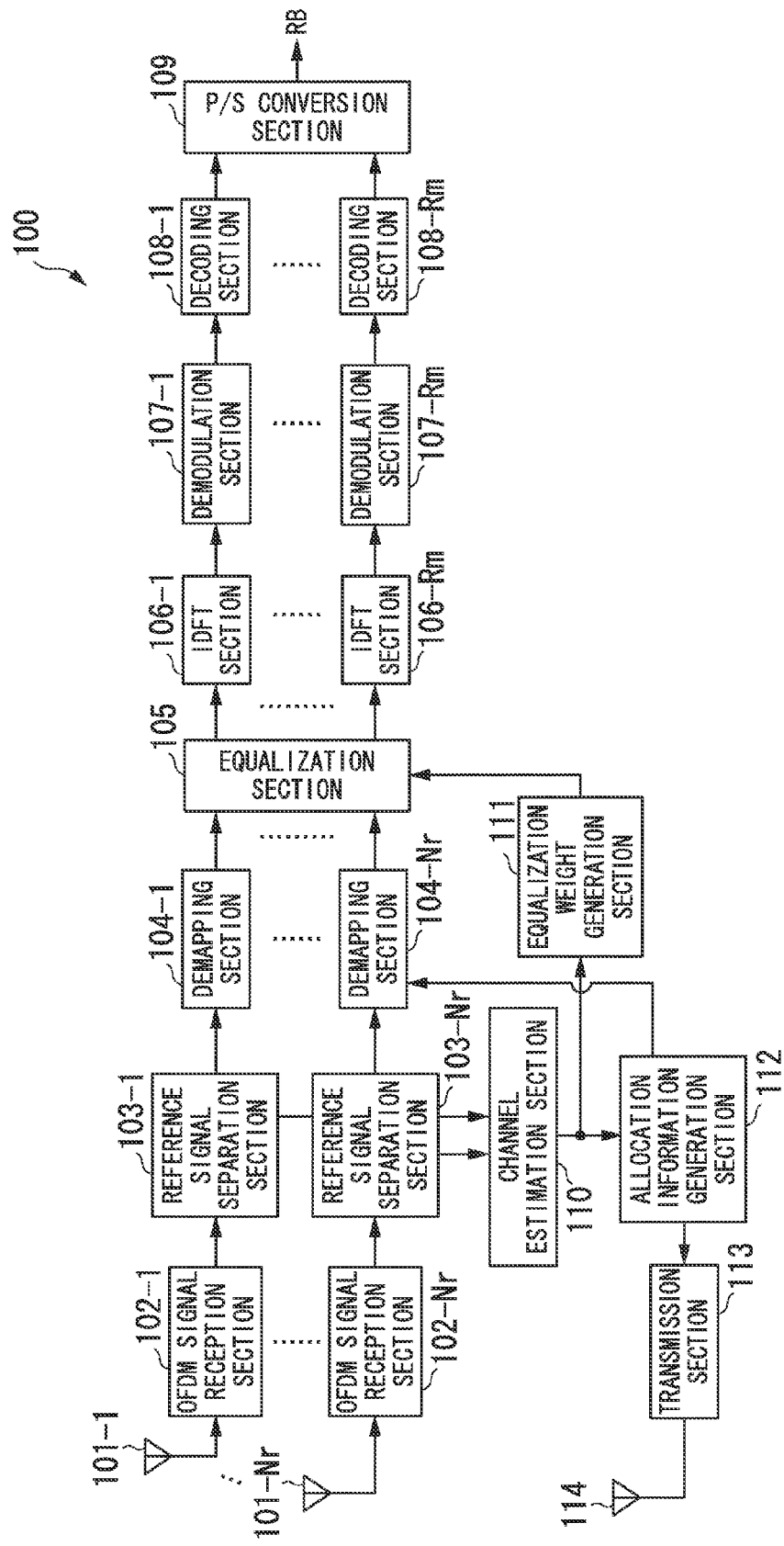
FIG. 4 is a schematic block diagram illustrating a configuration of a base station apparatus 100 in accordance with the same embodiment.

Signals transmitted from the mobile station apparatus 200a are received by N$_r$ reception antennas of the base station apparatus 100 via radio channels. FIG. 4 is a schematic block diagram illustrating a configuration of the base station apparatus 100 in accordance with this embodiment. The base station apparatus 100 includes reception antennas 101-1 to 101-N$_r$, OFDM signal reception sections 102-1 to 102-N$_r$, reference signal separation sections 103-1 to 103-N$_r$, demapping sections 104-1 to 104-N$_r$, an equalization section 105, inverse discrete Fourier transform (IDFT) sections 106-1 to 106-R$_m$, demodulation sections 107-1 to 107-R$_m$, decoding sections 108-1 to 108-R$_m$, a parallel-to-serial (P/S) conversion section 109, a channel estimation section 110, an equalization weight generation section 111, an allocation information generation section 112, a transmission section 113, and a transmission antenna 114.

The signals received by the N$_r$ reception antennas 101-1 to 101-N$_r$ are input to the OFDM signal reception sections 102-1 to 102-N$_r$, respectively. The OFDM signal reception sections 102-1 to 102-N perform down-conversion from carrier frequencies to baseband signals, analog filtering, analog-to-digital (A/D) conversion, and removal of a CP for every clustered symbol on the signals received by the corresponding reception antennas.

Further, the OFDM signal reception sections 102-1 to 102-N$_r$ perform N$_{FFT}$-point FFTs on signals from which the CPs are removed and conversion from time-domain signals into frequency-domain signals. N$_{FFT}$-point frequency spectra, which are outputs of the OFDM signal reception sections 102-1 to 102-N$_r$, are input to corresponding reference signal separation sections 103-1 to 103-N$_r$.

The reference signal separation sections 103-1 to 103-N$_r$ separate the input frequency spectra into data signals and reference signals (DMRSs and SRSs), output the reference signals to the channel estimation section 110, and output the data signals to the corresponding demapping sections 104-1 to 104-N$_r$, respectively. The channel estimation section 110 estimates a channel between each of the transmission antennas 210-1 to 210-N$_t$ of the mobile station apparatus 200a and each of the reception antennas 101-1 to 101-N$_r$ of the base station apparatus 100 using a reference signal (SRS) among input reception reference signals, and outputs the estimation result to the allocation information generation section 112. In addition, the channel estimation section 110 estimates a channel between each layer and each of the reception antennas 101-1 to 101-$N_r$ of the base station apparatus 100 using a reference signal (DMRS) among the input reception reference signals, and outputs the estimation result to the equalization weight generation section 111. The allocation information generation section 112 determines frequency allocation for every transmission antenna and a precoding matrix index to be multiplied in the mobile station apparatus 200a based on estimation results (channel gains) of channels with the transmission antennas 210-1 to 210-$N_t$, and inputs the determination result to the transmission section 113. The transmission section 113 transmits the frequency allocation and the precoding matrix index as control signals of the next transmission opportunity to the mobile station apparatus 200a via the transmission antenna 114. Details of the allocation information generation section 112 will be described later. In addition, the allocation information generation section 112 notifies the mobile station apparatus 200a of the frequency allocation of the next transmission opportunity via the transmission section 113, and outputs frequency allocation generated in the previous transmission opportunity, that is, frequency allocation in a received signal, to the demapping sections 104-1 to 104-$N_r$.

The equalization weight generation section 111 generates a weight matrix that suppresses interference between streams and interference between symbols. An equalization weight may be any one of an MMSE standard, a zero forcing (ZF) standard, and the like. The weight matrix generated by the equalization weight generation section 111 is input to the equalization section 105.

On the other hand, data signals each separated by the reference signal separation sections 103-1 to 103-$N_r$ are input to the corresponding demapping sections 104-1 to 104-$N_r$. The corresponding demapping sections 104-1 to 104-$N_r$ extract a frequency used for transmission by at least one of the $N_t$ transmission antennas 210-1 to 210-$N_t$ of the mobile station apparatus 200a based on allocation information received from the allocation information generation section 112, and input the extracted frequency to the equalization section 105. The equalization section 105 separates signals of R layers by multiplying equalization weights for outputs of the $N_r$ demapping sections 104-1 to 104-$N_r$. The separated signals of the R layers are input to the corresponding IDFT sections 106-1 to 106-R, respectively. When the number of layers, R, does not satisfy the maximum number of ranks, $R_m$, outputs of the equalization section 105 are input to IDFT sections for the number of layers, R, that is, the IDFT sections 106-1 to 106-R, without being input to the remaining IDFT sections.

The IDFT sections 106-1 to 106-R transform the input signals into time-domain signals according to IDFTs. The obtained time-domain signals corresponding to the layers are input to the corresponding demodulation sections 107-1 to 107-R, respectively. The demodulation sections 107-1 to 107-R demodulate the time-domain signals and convert the demodulated time-domain signals into bits. The decoding sections 108-1 to 108-R obtain a bit sequence by applying error-correction decoding to the bits obtained by the demodulation sections 107-1 to 107-R. The P/S conversion section 109 converts the bit sequence obtained by the decoding sections 108-1 to 108-R according to P/S conversion, and obtains a reception bit sequence RB.

Here, details of the process of the allocation information generation section 112 of FIG. 4 will be described. The allocation information generation section 112 first determines rank R, and then determines a precoding matrix to be used in the transmission processing section 208 of FIG. 2. According to the determination of the precoding matrix, transmission antennas to be used for transmission of layers for rank R are determined. The allocation information generation section 112 ultimately determines frequency allocation of each layer. That is, the allocation information generation section 112 notifies the mobile station apparatus of frequency allocation information, the number of pieces of which is the same as the number of ranks. The allocation information generation section 112 outputs information indicating rank R, information W (PMI) indicating a precoding matrix, and information indicating frequency allocation as allocation information to the transmission section 113. Because the number of pieces of allocation information is the same as the number of ranks, it is unnecessary to transmit the number of ranks. In addition, LTE-A, which is currently being standardized, is being configured with PMIs of ranks 1 to 4 defined by 6 bits and the number of ranks calculated according to the number of rows of a precoding matrix of the designated PMI when 4 transmission antennas are used. However, in this embodiment, more precise precoding than in the related art can be performed because the number of ranks is known according to the number of pieces of the allocation information and the number of bits of the PMI can be reduced in a state in which characteristics of the related art are maintained.

For example, rank R is determined based on the quality of a channel. At this time, a mean value or the like for all frequencies of signal-to-noise power ratios (SNRs) obtained based on channel estimation values and all combinations between transmission antennas and reception antennas is used as the quality of the channel. The precoding matrix may be predetermined, for example, according to rank R. A precoding matrix for which the same layer is allocated to combined transmission antennas by combining the transmission antennas having low quality of the channel may be selected. At this time, the mean value or the like for all frequencies of SNRs and all reception antennas may be used as the quality of the channel. Frequency allocation of each layer is determined based on the quality of the channel at each frequency of the transmission antenna to be used for transmission of the layer. At this time, a mean value or the like for all reception antennas of SNRs is used as the quality of the channel.

Hereinafter, the processes of the allocation information generation section 112 when Number of Transmission Antennas $N_t$ (=$R_m$)=Number of Ranks R, and when Number of Transmission Antennas $N_t$>Rank R will be described.

When Number of Transmission Antennas $N_t$=Rank R (referred to as full rank), an ($N_t \times N_t$) unit matrix is used as the precoding matrix, that is, w of Expression (1). According to an input channel estimation value, the allocation information generation section 112 determines allocation frequencies independently in the layers, that is, the transmission antennas 210-1 to 210-$N_t$. Here, the allocation unit may be a subcarrier (orthogonal frequency point), 12 subcarriers may be set as one resource block (RB) as in an LTE system, and an RB unit or a plurality of RBs may be allocated as one unit.

Figure 5:
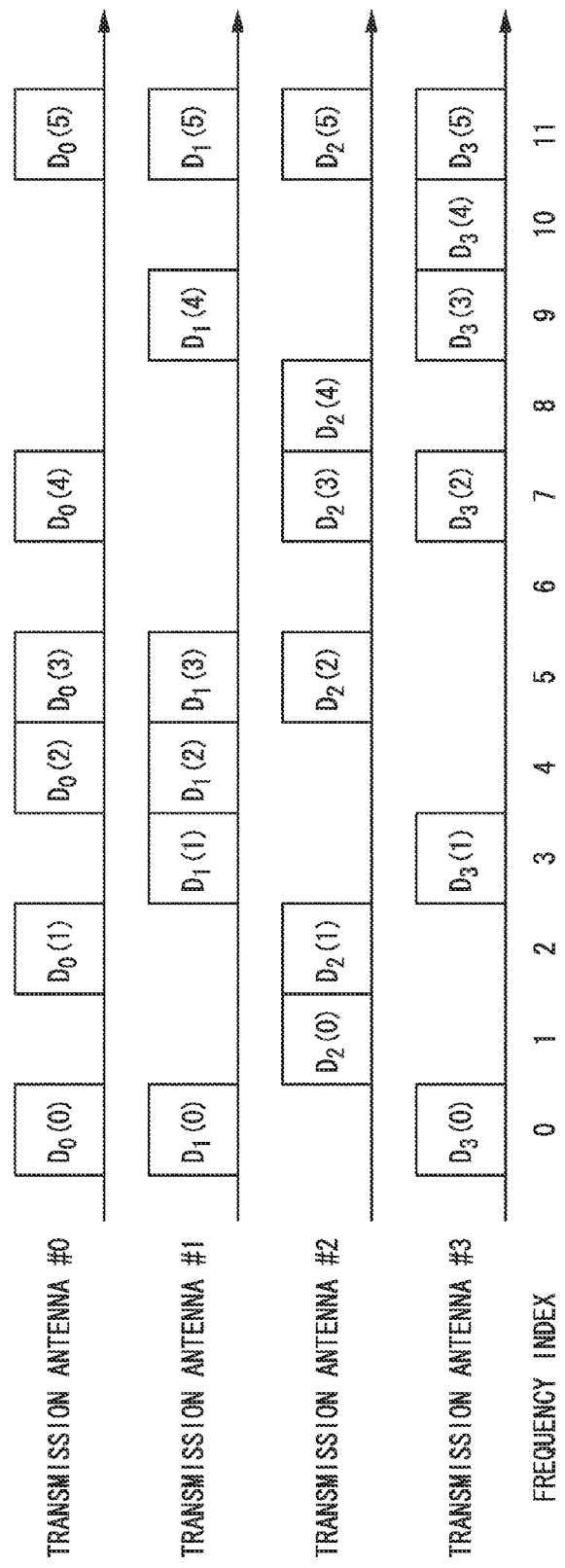
FIG. 5 is a diagram illustrating an example of frequency allocation in full rank in accordance with the same embodiment.

FIG. 5 is a diagram illustrating an example of frequency allocation in full rank. In FIG. 5, Number of Transmission Antennas $N_t$=4 and transmission antennas #0 to #3 correspond to the transmission antennas 210-1 to 210-4, respectively. In addition, $D_i$(n) denotes an (n+1)$^{th}$ frequency-domain signal of an (i+1)$^{th}$ layer. In FIG. 5, for transmission antenna #0, first to sixth frequency-domain signals ($D_0$(0) to $D_0$(5)) of a first layer among four layers are sequentially allocated to frequency indices 0, 2, 4, 5, 7, and 11. For transmission antenna #1, first to sixth frequency-domain signals ($D_1(0)$ to $D_1(5)$) of a second layer are sequentially allocated to frequency indices 0, 3, 4, 5, 9, and 11. For transmission antenna #2, first to sixth frequency-domain signals ($D_2(0)$ to $D_2(5)$) of a third layer are sequentially allocated to frequency indices 1, 2, 5, 7, 8, and 11. For transmission antenna #3, first to sixth frequency-domain signals ($D_3(0)$ to $D_3(5)$) of a fourth layer are sequentially allocated to frequency indices 0, 3, 7, 9, 10, and 11. Here, each frequency index represents the above-described allocation unit.

The allocation information generation section 112 may determine allocation of each transmission antenna by setting an SNR calculated from a channel estimation value estimated by the channel estimation section 110 of FIG. 4 as an allocation criterion, and determine allocation of each transmission antenna based on a signal-to-interference plus noise power ratio (SINR) considering interference between the remaining antennas after MMSE filtering when an MMSE filter is used in the equalization section 105 of FIG. 4.

When Number of Transmission Antennas $N_t$>Rank R, that is, when rank R is set to be less than the number of transmission antennas, $N_t$ interference between streams occurs if the same signal is transmitted by different frequency allocations in transmission antennas. When rank R is set to be less than the number of transmission antennas, $N_t$, the transmission antennas that transmit the same signal perform transmission using the same band and the use of different frequencies between transmission antennas that transmit different signals is permitted.

For example, when Number of Transmission Antennas $N_t$=4 and Rank R=3, the allocation information generation section 112 selects one precoding matrix w from the following Expressions (2-1) to (2-6). These expressions are the same as the precoding matrices of CMP considered in 3GPP. However, this embodiment is different from the related art in that frequency allocation (mapping) for every antenna is performed after precoding in the related art (for example, DL of LTE), but the precoding is performed using one selected from Expressions (2-1) to (2-6) after frequency allocation for every layer in this embodiment.

$$\frac{1}{2}\begin{bmatrix} 1 & 0 & 0 \\ a & 0 & 0 \\ 0 & 1 & 0 \\ 0 & 0 & 1 \end{bmatrix} \quad (2\text{-}1)$$

$$\frac{1}{2}\begin{bmatrix} 1 & 0 & 0 \\ 0 & 1 & 0 \\ a & 0 & 0 \\ 0 & 0 & 1 \end{bmatrix} \quad (2\text{-}2)$$

$$\frac{1}{2}\begin{bmatrix} 1 & 0 & 0 \\ 0 & 1 & 0 \\ 0 & 0 & 1 \\ a & 0 & 0 \end{bmatrix} \quad (2\text{-}3)$$

$$\frac{1}{2}\begin{bmatrix} 0 & 1 & 0 \\ 1 & 0 & 0 \\ a & 0 & 0 \\ 0 & 0 & 1 \end{bmatrix} \quad (2\text{-}4)$$

$$\frac{1}{2}\begin{bmatrix} 0 & 1 & 0 \\ 1 & 0 & 0 \\ 0 & 0 & 1 \\ a & 0 & 0 \end{bmatrix} \quad (2\text{-}5)$$

$$\frac{1}{2}\begin{bmatrix} 0 & 1 & 0 \\ 0 & 0 & 1 \\ 1 & 0 & 0 \\ a & 0 & 0 \end{bmatrix} \quad (2\text{-}6)$$

Here, $a \in \{\pm 1, \pm j\}$

That is, one is selected from among precoding matrices of 6×4=24 patterns. Here, j is an imaginary unit. In this embodiment, the allocation information generation section 112 multiplies a matrix H (Expression (3)) of propagation estimation values between $N_t$ transmission antennas and $N_r$ reception antennas input from the channel estimation section 110 by one of the precoding matrices expressed in Expressions (2-1) to (2-6), generates an equivalent channel matrix $\tilde{H}$ (Expression (4)), and obtains a channel capacity C from Expression (5) using the equivalent channel matrix.

$$H = \begin{bmatrix} h_{0,0} & \cdots & h_{0,Nt-1} \\ \vdots & \ddots & \vdots \\ h_{Nr-1,Nt-1} & \cdots & h_{Nr-1,Nr-1} \end{bmatrix} \quad (3)$$

$$\tilde{H} = wH \quad (4)$$

$$C = \log(det(\tilde{H}^H \tilde{H} + I_{Nt})) \quad (5)$$

Here, $I_{Nt}$ is an ($N_t \times N_t$) unit matrix.

The above process is performed on precoding matrices of all 24 patterns, and a precoding matrix having a highest channel capacity C is selected and transmitted as control information to the mobile station apparatus via the transmission section 113. Although the channel capacity has been set as an evaluation target in the above description, a precoding matrix may be determined from a channel capacity considering a process (MMSE, ZF, or MLD) of the reception side. In addition, the same precoding matrix is not selected in all bands, and precoding may be determined for every frequency allocation unit (subcarrier or RB).

Figure 6:
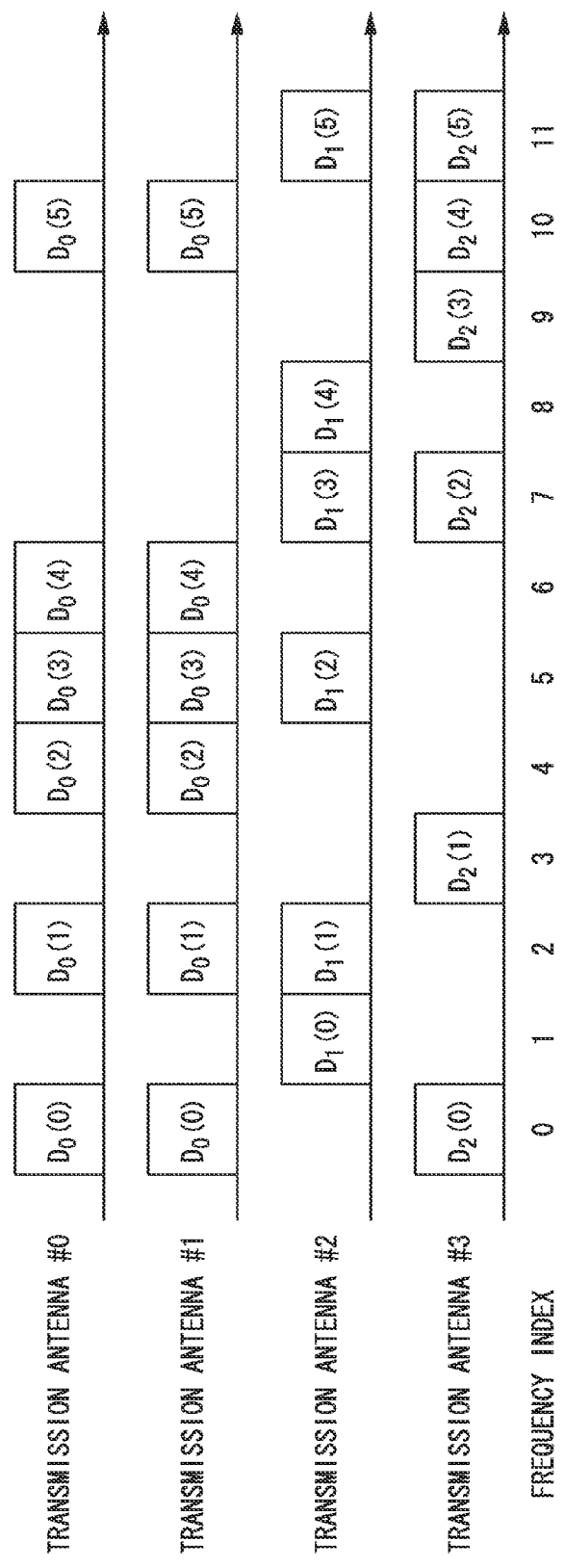
FIG. 6 is a diagram illustrating an example of frequency allocation when Expression (6) is used as a precoding matrix w in accordance with the same embodiment.

FIG. 6 is a diagram illustrating an example of frequency allocation when a=1 of Expression (2-1) (that is, the following Expression (6)) is used as a precoding matrix w.

$$w = \frac{1}{2}\begin{bmatrix} 1 & 0 & 0 \\ 1 & 0 & 0 \\ 0 & 1 & 0 \\ 0 & 0 & 1 \end{bmatrix} \quad (6)$$

In FIG. 6, Number of Transmission Antennas $N_t$=4 and transmission antennas #0 to #3 correspond to the transmission antennas 210-1 to 210-4, respectively. In FIG. 6, for transmission antenna #0, first to sixth frequency-domain signals ($D_0(0)$ to $D_0(5)$) of a first layer are sequentially allocated to frequency indices 0, 2, 4, 5, 6, and 10. For transmission antenna #1, the first to sixth frequency-domain signals ($D_0(0)$ to $D_0(5)$) of the first layer are sequentially allocated to frequency indices 0, 2, 4, 5, 6, and 10. For transmission antenna #2, first to sixth frequency-domain signals ($D_1(0)$ to $D_1(5)$) of a second layer are sequentially allocated to frequency indices 1, 2, 5, 7, 8, and 11. For transmission antenna #3, first to sixth frequency-domain signals ($D_2(0)$ to $D_2(5)$) of a third layer are sequentially allocated to frequency indices 0, 3, 7, 9, 10, and 11.

Although the same signal vector $D_0$ ($D_0(0)$ to $D_0(5)$) is transmitted from transmission antennas #0 and #1 if the precoding matrix w of Expression (6) is used, interference between streams occurs regardless of the transmission of the same signal if transmission is performed using different frequency allocations in transmission antennas #0 and #1. In this embodiment, as illustrated in FIG. 6, the allocation information generation section 112 determines frequency allocation for every layer so that transmission is performed using the same frequency in transmission antennas #0 and #1. Thereby, the reception side (base station apparatus 100) can separate a signal for every layer without separating a signal for every transmission antenna.

Transmission antennas #2 and #3 transmit signal vectors $D_1$ and $D_2$, but the reception side should perform a signal separation process because transmission signals are different even when the same frequency allocation as in transmission antennas #0 and #1 is performed. Accordingly, it is only necessary to allocate frequencies (spectra) so that the quality of reception becomes best in transmission antennas #2 and #3 regardless of allocations in transmission antennas #0 and #1. During allocation, the allocation may be determined in consideration of the signal separation process in the equalization section 105 of the reception side. For example, allocation may be performed so that an SINR after MMSE is highest when MMSE filtering is performed, and allocation may be performed so that an SNR is highest when an interference canceller or the like is included in the equalization section 105, Description when Number of Transmission Antennas $N_t$=4 and Rank R=2 will be given as another example when Number of Transmission Antennas $N_t$>Rank R. When Number of Transmission Antennas $N_t$=4 and Rank R=2, the allocation information generation section 112 uses the following Expression (7) as the precoding matrix w.

$$w = \begin{bmatrix} 1 & 0 \\ 1 & 0 \\ 0 & 1 \\ 0 & 1 \end{bmatrix} \quad (7)$$

Figure 7:
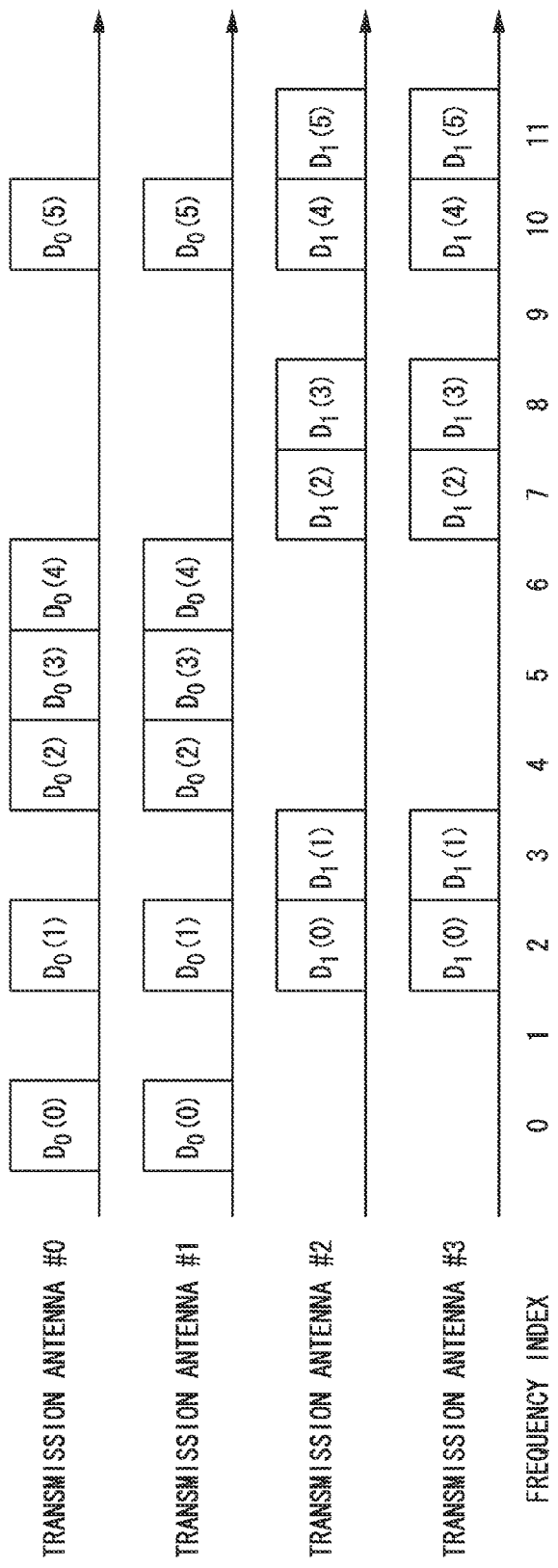
FIG. 7 is a diagram illustrating an example of frequency allocation when Expression (7) is used as a precoding matrix w in accordance with the same embodiment.

FIG. 7 is a diagram illustrating an example of frequency allocation when Expression (7) is used as a precoding matrix w. In FIG. 7, Number of Transmission Antennas $N_t$=4 and transmission antennas #0 to #3 correspond to the transmission antennas 210-1 to 210-4, respectively. In FIG. 7, for transmission antennas #0 and #1, first to sixth frequency-domain signals ($D_0(0)$ to $D_0(5)$) of a first layer are sequentially allocated to frequency indices 0, 2, 4, 5, 6, and 10. For transmission antennas #2 and #3, first to sixth frequency-domain signals ($D_1(0)$ to $D_1(5)$) of a second layer are sequentially allocated to frequency indices 2, 3, 7, 8, 10, and 11.

Although the same signal vector $D_0$ is transmitted from transmission antennas #0 and #1 using Expression (7) as described above, the allocation information generation section 112 determines frequency allocation for every layer so that transmission antennas #0 and #1 perform transmission using the same frequency. In addition, although a signal vector $D_1$ is transmitted from transmission antennas #2 and #3 as shown in Expression (7), transmission antennas #2 and #3 perform transmission using the same frequency because the allocation information generation section 112 determines frequency allocation for every layer. Different frequency allocations can be used as frequency allocations of transmission antennas #0 and #0, that is, frequency allocation of a first layer, and frequency allocations of transmission antennas #2 and #3, that is, frequency allocation of a second layer. In addition, as another example, the following Expression (8) may be used as a precoding matrix w.

$$w = \begin{bmatrix} 0 & 1 \\ 0 & j \\ 0 & -1 \\ 1 & 0 \end{bmatrix} \quad (8)$$

When Expression (8) is used, the same allocation is performed as frequency allocations of transmission antennas #0 to #2, and a signal of the second layer is transmitted using these transmission antennas. Only frequency allocation of transmission antenna #3 is permitted to be different from the frequency allocations of transmission antennas #0 to #2.

Figure 8:
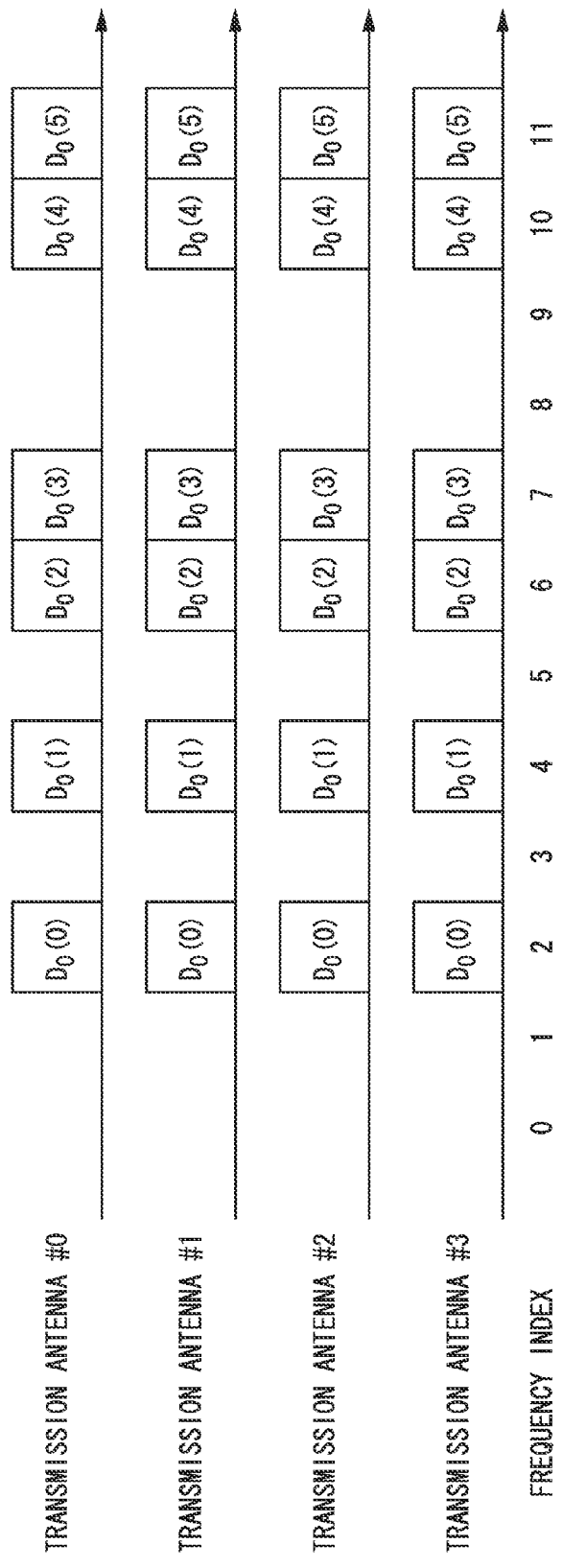
FIG. 8 is a diagram illustrating an example of frequency allocation when Expression (8) is used as a precoding matrix w in accordance with the same embodiment.

Description when Number of Transmission Antennas $N_t$=4 and Rank R=1 will be given as another example when Number of Transmission Antennas $N_t$>Rank R. FIG. 8 is a diagram illustrating an example of frequency allocation when Expression (9) is used as the precoding matrix w.

$$w = \begin{bmatrix} 1 \\ 1 \\ 1 \\ 1 \end{bmatrix} \quad (9)$$

In FIG. 8, Number of Transmission Antennas $N_t$=4 and transmission antennas #0 to #3 correspond to the transmission antennas 210-1 to 210-4, respectively. In FIG. 8, for transmission antennas #0 and #3, first to sixth frequency-domain signals ($D_0(0)$ to $D_0(5)$) of a first layer are sequentially allocated to frequency indices 2, 4, 6, 7, 10, and 11. As described above, the same signal vector $D_0$ is transmitted from all transmission antennas #0 and #3. As a result, the mobile station apparatus 200a can perform transmission so that interference between antennas does not occur at the reception side.

Figure 9:
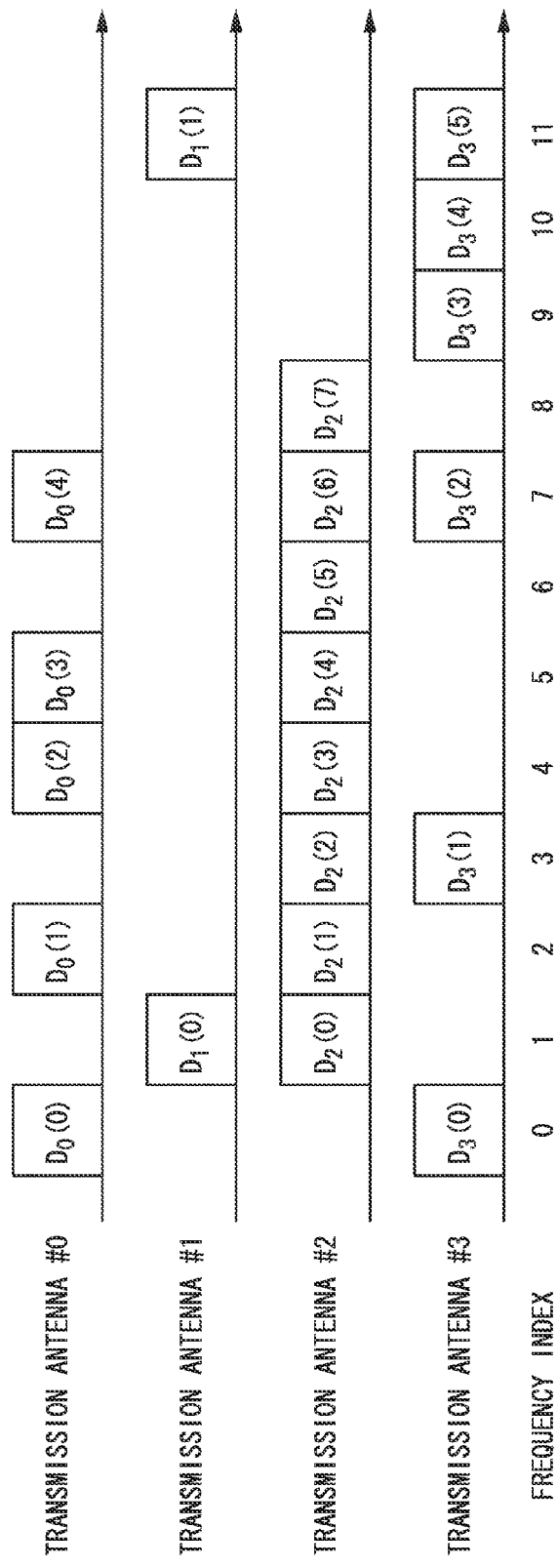
FIG. 9 is a diagram illustrating an example of frequency allocation in which the number of used frequency points is different between transmission antennas in accordance with the same embodiment.

Although the case in which the number of spectra to be transmitted from each transmission antenna is the same has been described in the examples of FIGS. 5 to 8, the number of spectra to be transmitted from each transmission antenna may be changed in consideration of the performance of each transmission antenna, the performance of a power amplifier of the mobile station apparatus 200a, or an instant channel state. In this case, the allocation information generation section 112 performs allocation in which the number of used frequency points is different in each transmission antenna as in FIG. 9 when the number of transmission antennas, $N_t$, is 4 and rank R is 4. At this time, the number of DFT points of the DFT sections 204-1 to 204-$R_m$ of FIG. 2 is a different value for every layer.

Figure 10:
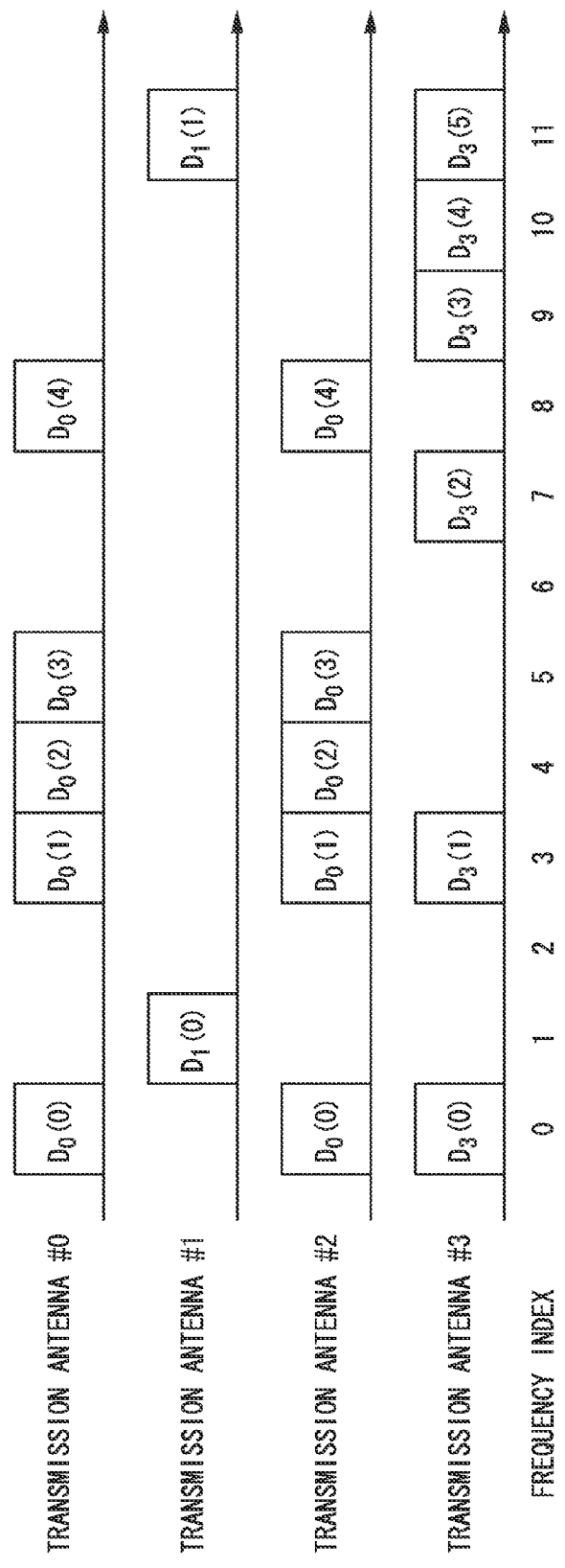
FIG. 10 is a diagram illustrating an example of frequency allocation in the case in which the number of transmission antennas, $N_t$, is 4 and rank R is 3 in accordance with the same embodiment.

FIG. 10 is a diagram illustrating an example of frequency allocation when the number of transmission antennas, $N_t$, is 4 and rank R is 3. In FIG. 10, a signal of the same data (layer) is transmitted from transmission antennas #0 and #2. At this time, frequency allocations of transmission antennas #0 and #2 are the same. Because of the same frequency allocation, the number of DFT points is the same between DFT sections in transmission antennas #0 and #2 of FIG. 2. However, frequency allocations of transmission antennas #1 and #3 need not be the same as those of transmission antennas #0 and #2, and the number of frequency points to be used may be different. Although detailed description when rank R is 2 and 1 is omitted, the number of frequency points to be used in transmission antennas that transmit the same data is the same, but the number of frequency points to be used in antennas that transmit different data may be different.

As described above, frequency allocations of transmission antennas become the same according to the number of ranks in a communication system that permits different frequency allocations in the transmission antennas. Specifically, when a precoding matrix is decomposed into column vectors, frequency allocation become the same in transmission antennas having values other than zero in terms of layers having a plurality of values other than zero. By performing a process within the allocation information generation section 112 as described above, it is possible to suppress interference between streams and perform good transmission when full rank is not provided in a communication system that permits different frequency allocations in transmission antennas.

Second Embodiment

Although an example of single-carrier transmission (clustered DFT-S-OFDM) in which precoding is performed at the reception side has been described in the first embodiment, optimum gain by precoding is likely not to be obtained because optimum precoding is different when a base station apparatus determines a precoding matrix and when a mobile station apparatus actually performs precoding, except for low-speed movement. Accordingly, during high-speed movement, open-loop transmission diversity such as a space time block code (STBC), a space frequency block code (SFBC), or cyclic delay diversity (CDD) may be applied. The case in which STBC is applied as the open-loop transmission diversity will be described in this embodiment.

Configurations of mobile station apparatuses 300a to 300d in accordance with this embodiment are substantially the same as that of the mobile station apparatus 200a in accordance with the first embodiment. However, any one of transmission processing sections 208a to 208d is provided instead of the transmission processing section 208, and a process to be performed on a frequency-domain signal is different. Configurations of the transmission processing sections 208a to 208d of the mobile station apparatuses 300a to 300d in accordance with the second embodiment will be described using FIGS. 11 to 14. Here, the number of transmission antennas, $N_t$, is 4.

Figure 11:
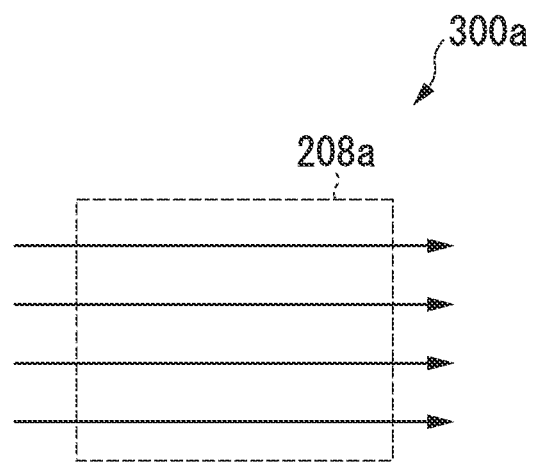
FIG. 11 is a schematic block diagram illustrating a configuration of a transmission processing section 208a of a mobile station apparatus 300a in accordance with a second embodiment of the present invention.

FIG. 11 is a schematic block diagram illustrating a configuration of the transmission processing section 208a of the mobile station apparatus 300a. The number of transmission antennas, $N_t$, of the mobile station apparatus 300b and rank R are both 4. The transmission processing section 208a directly outputs an input frequency-domain signal without performing signal processing. Although the signal is directly output in FIG. 11, a transmission antenna that performs transmission between layers in a clustered symbol unit, a slot unit, or a subframe unit may be switched (this is referred to as a layer shift), and 4×4 precoding may be performed so that the number of outputs does not change. The allocation information generation section 112 independently performs frequency allocation for every transmission antenna for the mobile station apparatus 300a.

Figure 12:
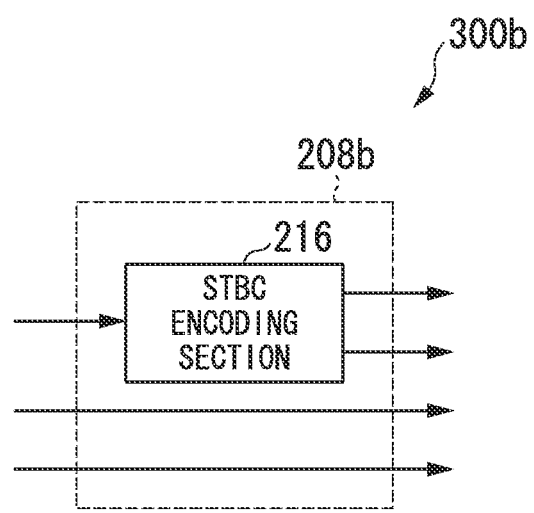
FIG. 12 is a schematic block diagram illustrating a configuration of a transmission processing section 208b of a mobile station apparatus 300b in accordance with the same embodiment.

FIG. 12 is a schematic block diagram illustrating a configuration of the transmission processing section 208b of the mobile station apparatus 300b. The number of transmission antennas, $N_t$, of the mobile station apparatus 300b is 4 and rank R is 3. The transmission processing section 208b includes an STBC encoding section 216 that performs STBC encoding on a signal in a first layer. The STBC encoding section 216 performs STBC encoding on signal $A_0(m)$ ($0 \leq m \leq N_{DFT}-1$) at time t and signal $B_0(m)$ ($0 \leq m \leq N_{DFT}-1$) at time t+1 in the first layer. In addition, signal $A_1(m)$ at time t in a second layer and signal $A_2(m)$ at time t in a third layer are directly output without being input to the STBC encoding section 216. In addition, signal $B_1(m)$ at time t+1 in the second layer and signal $B_2(m)$ at time t+1 in the third layer are also directly output without being input to the STBC encoding section 216.

Figure 13:
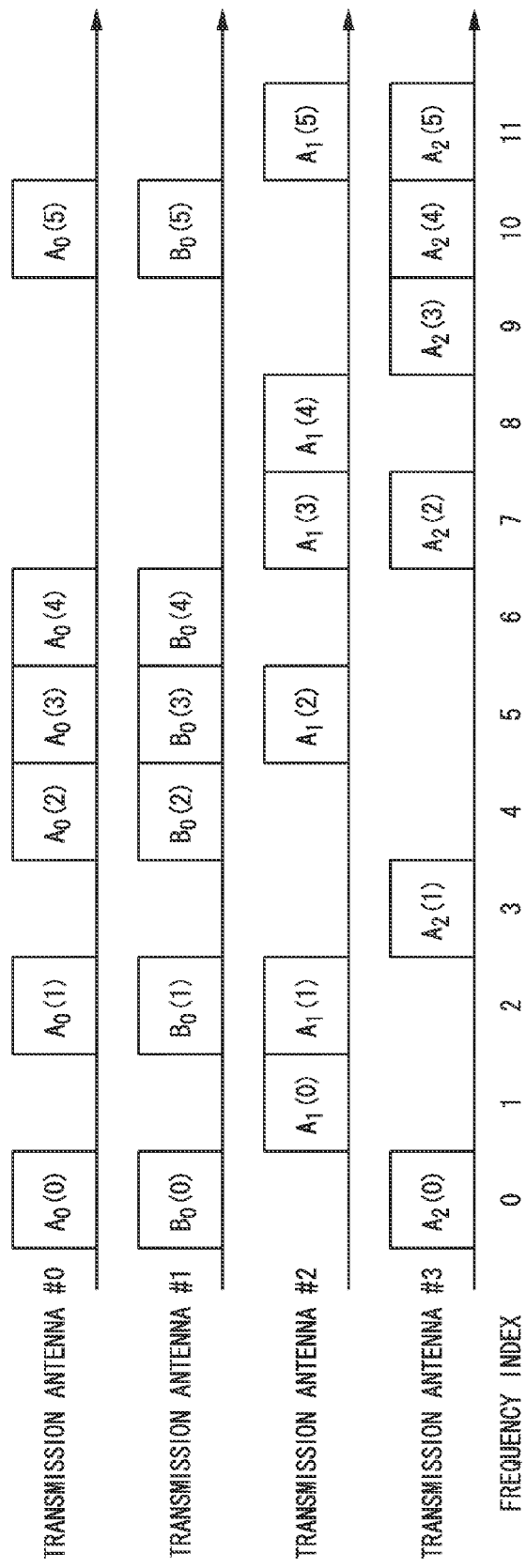
FIG. 13 is a schematic block diagram illustrating an example of frequency allocation at time t of the mobile station apparatus 300b in accordance with the same embodiment.
Figure 14:
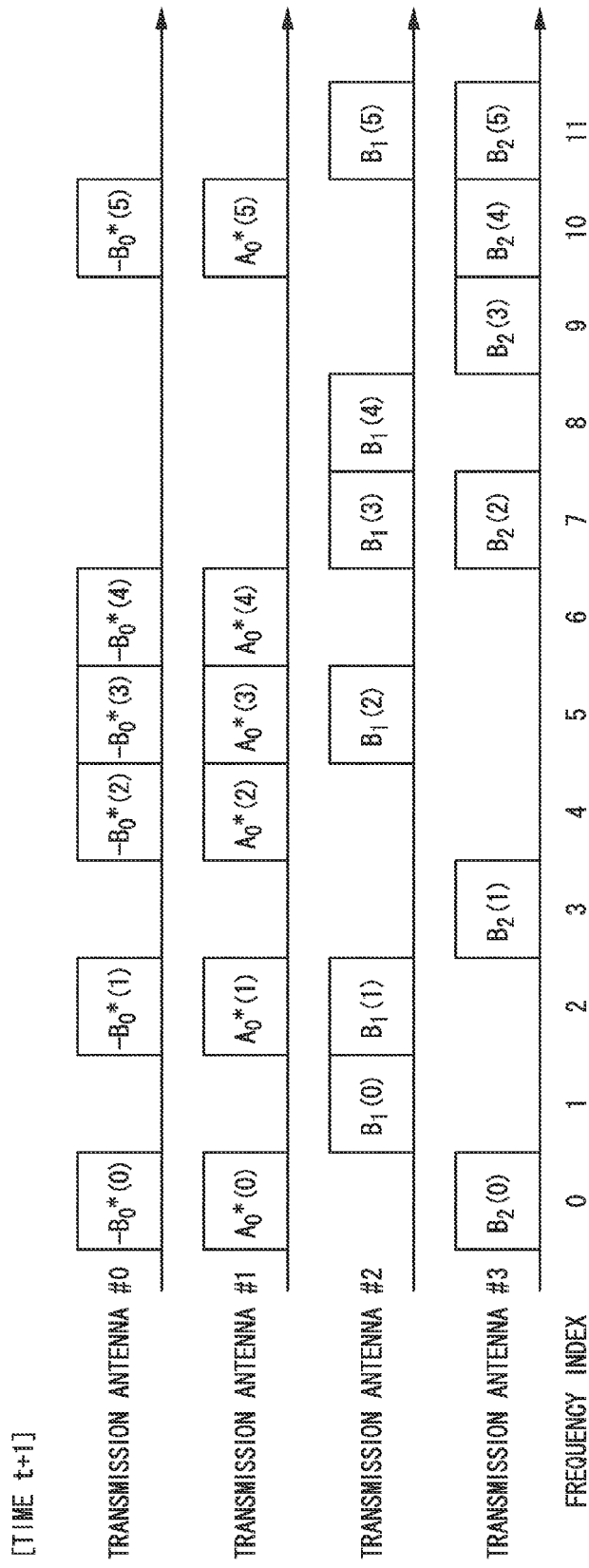
FIG. 14 is a schematic block diagram illustrating an example of frequency allocation at time t+1 of the mobile station apparatus 300b in accordance with the same embodiment.

FIGS. 13 and 14 illustrate examples of frequency allocation by the allocation information generation section 112. FIG. 13 is a diagram illustrating an example of frequency allocation at time t of the mobile station apparatus 300b, and FIG. 14 is a diagram illustrating an example of frequency allocation at time t+1 of the mobile station apparatus 300b. In FIGS. 13 and 14, Number of Transmission Antennas $N_t=4$ and transmission antennas #0 to #3 correspond to the transmission antennas 210-1 to 210-4, respectively. As described above, the mobile station apparatus 300b transmits STBC encoded signals from transmission antennas #0 and #1, and transmits independent data signals from transmission antennas #2 and #3.

That is, at time t, as illustrated in FIG. 13, for transmission antenna #0, first to sixth frequency-domain signals ($A_0(0)$ to $A_0(5)$) at time t of a first layer are sequentially allocated to frequency indices 0, 2, 4, 5, 6, and 10. For transmission antenna #1, first to sixth frequency-domain signals ($B_0(0)$ to $B_0(5)$) at time t+1 of the first layer are sequentially allocated to frequency indices 0, 2, 4, 5, 6, and 10. For transmission antenna #2, first to sixth frequency-domain signals ($A_1(0)$ to $A_1(5)$) at time t of a second layer are sequentially allocated to frequency indices 1, 2, 5, 7, 8, and 11. For transmission antenna #3, first to sixth frequency-domain signals ($A_2(0)$ to $A_2(5)$) at time t of a third layer are sequentially allocated to frequency indices 0, 3, 7, 9, 10, and 11.

Further, at time t+1, as illustrated in FIG. 14, for transmission antenna #0, values ($-B_0^*(0)$ to $-B_0^*(5)$) obtained by multiplying complex conjugates of first to sixth frequency-domain signals ($B_0(0)$ to $B_0(5)$) at time t+1 of a first layer by $-1$ are sequentially allocated to frequency indices 0, 2, 4, 5, 6, and 10. For transmission antenna #1, complex conjugates ($A_0^*(0)$ to $A_0^*(5)$) of first to sixth frequency-domain signals ($A_0(0)$ to $A_0(5)$) at time t of the first layer are sequentially allocated to frequency indices 0, 2, 4, 5, 6, and 10. For transmission antenna #2, first to sixth frequency-domain signals ($B_1(0)$ to $B_1(5)$) at time t+1 of a second layer are sequentially allocated to frequency indices 1, 2, 5, 7, 8, and 11. For transmission antenna #3, first to sixth frequency-domain signals ($B_2(0)$ to $B_2(5)$) at time t+1 of a third layer are sequentially allocated to frequency indices 0, 3, 7, 9, 10, and 11.

The allocation information generation section 112 performs frequency allocation for the mobile station apparatus 300b so that the same frequency allocation is performed for transmission antennas #0 and #1 as illustrated in FIGS. 13 and 14, and arbitrary frequency allocations are each independently performed for transmission antennas #2 and #3. Although encoding illustrated in FIGS. 13 and 14 is performed as STBC encoding, a negative sign at time t+1 may be attached to transmission antenna #1 instead of transmission antenna #0 or a complex conjugate attached to transmission antenna #0 at time t+1 may be attached to transmission antenna #1 at time t.

Figure 15:
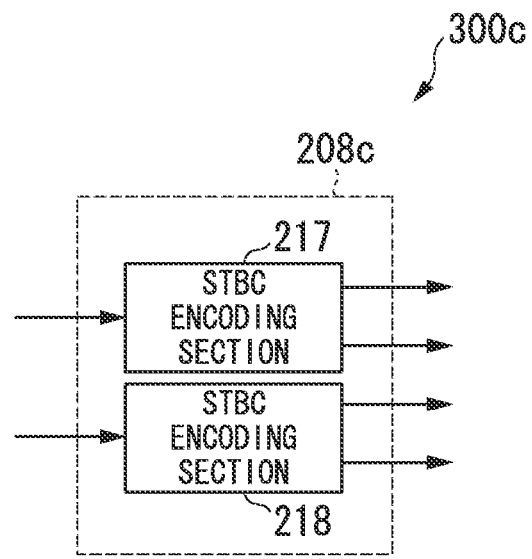
FIG. 15 is a schematic block diagram illustrating a configuration of a transmission processing section 208c of a mobile station apparatus 300c in accordance with the same embodiment.

FIG. 15 is a schematic block diagram illustrating a configuration of the transmission processing section 208c of the mobile station apparatus 300c. The number of transmission antennas, $N_t$, of the mobile station apparatus 300b is 4 and rank R is 2. The transmission processing section 208c includes an STBC encoding section 218. The STBC encoding section 217 performs STBC encoding on a first layer, and the STBC encoding section 218 performs STBC encoding on a second layer. The allocation information generation section 112 determines frequency allocations so that frequency allocations in transmission antennas #0 and #1 are the same and frequency allocations in transmission antennas #2 and #3 are the same for the mobile station apparatus 300c.

Although an example in which the mobile station apparatus 300c transmits two layers from two transmission antennas using STBCs is shown, one layer may be configured to be transmitted from three transmission antennas (for example, transmission antennas #0, #1, and #2) and the remaining one layer may be configured to be transmitted from one transmission antenna (for example, transmission antenna #3). In this case, the allocation information generation section 112 determines frequency allocations so that the frequency allocations in transmission antennas #0, #1, and #2 are the same for the mobile station apparatus 300c.

Figure 16:
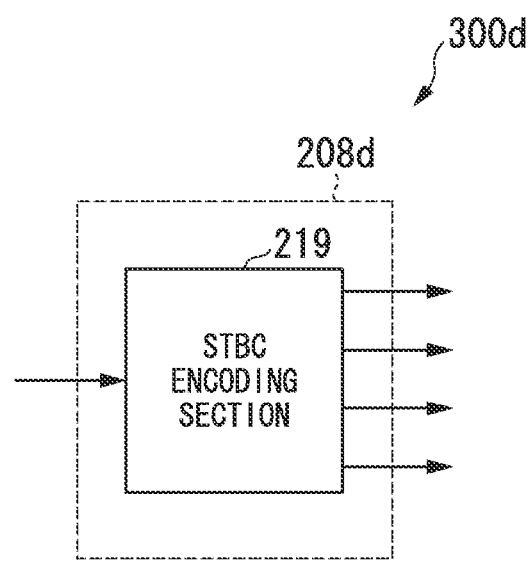
FIG. 16 is a schematic block diagram illustrating a configuration of a transmission processing section 208d of a mobile station apparatus 300d in accordance with the same embodiment.

FIG. 16 is a schematic block diagram illustrating a configuration of the transmission processing section 208d of the mobile station apparatus 300d. The number of transmission antennas, $N_t$, of the mobile station apparatus 300d is 4 and rank R is 1. The transmission processing section 208d includes an STBC encoding section 219. The STBC encoding section 219 applies STBC encoding to a first layer, and transmission from four transmission antennas is performed. The allocation information generation section 112 determines frequency allocations so that frequency allocations in transmission antennas #0 to #3 are the same for the mobile station apparatus 300d.

Although an STBC is applied in a frequency domain in this embodiment, the transmission processing sections 208a to 208d may be arranged after an IFFT section and the STBC may be applied in a time domain. In addition, although an example of the STBC has been shown, any technology for transmitting information regarding the same data such as an SFBC, CDD, or the like from different antennas at the same time and at the same frequency can be applied. Further, it is possible to multiply a precoding matrix as shown in the first embodiment in the above-described technology or also use technology (layer shift) for switching an antenna that performs transmission between layers. In addition, for example, the two STBC encoding sections 217 and 218 are configured to be provided within the transmission processing section 208c in FIG. 15. However, there may be different transmission diversity technologies such as an STBC and SFBC within the transmission processing section 208c.

As described above, it is possible to transmit data so that interference between antennas does not occur by limiting frequency allocation according to rank to be transmitted, that is, by performing the same frequency allocation for transmission antennas from which the same data is transmitted. As a result, it is possible to improve user throughput.

In addition, some functions of the mobile station apparatus and the base station apparatus in accordance with each embodiment described above may be implemented by recording a program for implementing the functions on a computer-readable recording medium and causing a computer system provided in each apparatus to read and execute the program recorded on the recording medium. The "computer system" used herein includes an operating system (OS) and/or hardware such as peripheral devices.

In addition, the "computer-readable recording medium" refers to a storage apparatus such as a flexible disk, a magneto-optical disc, a read only memory (ROM), a portable medium such as a compact disc-ROM (CD-ROM), or a hard disk embedded in the computer system. Further, the "computer-readable recording medium" may include a medium for temporarily and dynamically storing programs, like a communication line when a program is transmitted via a network such as the Internet or a communication line such as a telephone line, and a medium for storing programs for a predetermined time, like a volatile memory inside a computer system including a server and a client in that case. The program may be a program for implementing some of the above-described functions. Alternatively, the program may be a program capable of realizing the above-described functions through a combination with a program previously stored in a computer system.

In addition, all or part of the mobile station apparatus and the base station apparatus in the above-described embodiment may be implemented as large scale integration (LSI), which is a typical integrated circuit. Each functional block of the mobile station apparatus and the base station apparatus may be implemented by a separated chip, and all or part may be integrated and implemented by a chip. In addition, a technique of an integrated circuit may be implemented by a dedicated circuit or a general-purpose processor as well as LSI. In addition, when technology of an integrated circuit, which is a substitute for LSI, appears with the development of semiconductor technology, an integrated circuit by the above-described technology can be used.

Although the embodiment of the present invention has been described above in detail with reference to the drawings, specific configurations are not limited to the above-described embodiment, and various design changes can be made without departing from the spirit and scope of the present invention.

INDUSTRIAL APPLICABILITY

The present invention can be used in a mobile communication system in which a portable telephone apparatus is set as a terminal apparatus.

REFERENCE SYMBOLS

10: Wireless communication system
100: Base station apparatus
101-1, . . . , 101-$N_r$: Reception antenna
102-1, . . . , 102-$N_r$: OFDM signal reception section
103-1, . . . , 103-$N_r$: Reference signal separation section
104-1, . . . , 104-$N_r$: Demapping section
105: Equalization section
106-1, . . . , 106-$R_m$: IDFT section
107-1, . . . , 107-$R_m$: Demodulation section
108-1, . . . , 108-$R_m$: Decoding section
109: P/S conversion section
110: Channel estimation section
111: Equalization weight generation section
112: Allocation information generation section
113: Transmission section
114: Transmission antenna
200a, 200b, 200c: Mobile station apparatus
201: S/P conversion section
202-1, . . . , 202-$R_m$: Encoding section
203-1, . . . , 203-$R_m$: Modulation section
204-1, . . . , 204-$R_m$: DFT section
205: Reference signal generation section
206-1, . . . , 206-$R_m$: Reference signal multiplexing section
207-1, . . . , 207-$R_m$: Mapping section
208: Transmission processing section
209-1, . . . , 209-$R_m$: OFDM signal generation section 210-1, ..., 210-$R_m$: Transmission antenna
211: Reception antenna
212: Reception section
213: Allocation information acquisition section
214: Precoding section
215: Transmission weight matrix acquisition section
300a, 300b, 300c, 300d: Mobile station apparatus

The invention claimed is:

1. A terminal apparatus comprising:
first and second transmission antennas;
a mapping section configured to allocate a first signal to a first frequency, and allocate a second signal to a second frequency; and
a transmission processing section configured to transmit the first signal via the first transmission antenna, and transmit the second signal via the second transmission antenna,
wherein the transmission processing section is configured to transmit the first signal generated from first bit sequence, and transmit the second signal generated from the first bit sequence, in a case that the first frequency is the same as the second frequency, and
the transmission processing section is configured to transmit the first signal generated from the first bit sequence, and transmit the second signal generated from a second bit sequence different from the first bit sequence, in a case that the first frequency is different from the second frequency.

2. The terminal apparatus according to claim 1, wherein the first signal is generated from a first frequency point number, and
the second signal is generated from a second frequency point number different from the first frequency point number.

3. The terminal apparatus according to claim 1, wherein frequency allocation information is transmitted from a base station apparatus which communicates with the terminal apparatus, the frequency allocation information being used for allocating the first and second signals to the first and second frequencies.

4. A terminal apparatus comprising:
first and second transmission antennas;
a mapping section configured to allocate a first signal to a first frequency, and allocate a second signal to a second frequency; and
a transmission processing section configured to transmit the first signal via the first transmission antenna, and transmit the second signal via the second transmission antenna,
wherein the mapping section is configured to set such that the second frequency is the same as the first frequency, in a case that the first signal was generated from a first bit sequence, and the second signal was generated from the first bit sequence, and
the mapping section is configured to set such that the first frequency is different from the second frequency, in a case that the first signal was generated from the first bit sequence, and the second signal was generated from a second bit sequence different from the first bit sequence.

5. The terminal apparatus according to claim 4, wherein the first signal is generated from first frequency point number, and
the second signal is generated from a second frequency point number different from the first frequency point number.

6. The terminal apparatus according to claim 4, wherein frequency allocation information is transmitted from a base station apparatus which communicates with the terminal apparatus, the frequency allocation information being used for allocating the first and second signals to the first and second frequencies.

7. A base station apparatus comprising:
an allocation information generation section configured to generate frequency allocation information, the frequency allocation information being used by a terminal apparatus in a case that first and second signals are allocated to first and second frequencies, the terminal apparatus including first and second transmission antennas and a transmission processing section, the transmission processing section transmitting the first signal by the first frequency, the transmission processing section transmitting the second signal by the second frequency; and
a transmission section configured to transmit, to the terminal apparatus, the frequency allocation information generated by the allocation information generation section,
wherein the allocation information generation section is configured to generate the frequency allocation information such that the second frequency is the same as the first frequency, in case that the first signal was generated from first bit sequence, and the second signal was generated from the first bit sequence, and
the allocation information generation section is configured to generate the frequency allocation information such that the second frequency is different from the first frequency, in a case that the first signal was generated from the first bit sequence, and the second signal was generated from a second bit sequence different from the first bit sequence.

8. The base station apparatus according to claim 7, further comprising a channel estimation section configured to estimate channel estimation value of a channel between the terminal apparatus and the base station apparatus, wherein the channel estimation section is configured to generate the frequency allocation information based on the channel estimation value estimated by the channel estimation section.

9. A communication system comprising a terminal apparatus and a base station apparatus, wherein
the terminal apparatus comprises:
first and second transmission antennas;
a mapping section configured to allocate a first signal to a first frequency, and allocate a second signal to a second frequency; and
a transmission processing section configured to transmit the first signal via the first transmission antenna, and transmit the second signal via the second transmission antenna,
wherein the transmission processing section is configured to transmit the first signal generated from a first bit sequence, and transmit the second signal generated from the first bit sequence, in a case that the first frequency is the same as the second frequency, and
the transmission processing section is configured to transmit the first signal generated from the first bit sequence, and transmit the third second signal generated from a second bit sequence different from the first bit sequence, in a case that the first frequency is different from the second frequency.

10. A communication system comprising a terminal apparatus and a base station apparatus, wherein
the terminal apparatus comprises:
first and second transmission antennas;
a mapping section configured to allocate a first signal to a first frequency, and allocate a second signal to a second frequency; and
a transmission processing section configured to transmit the first signal via the first transmission antenna, and transmit the second signal via the second transmission antenna,
wherein the mapping section is configured to set such that the second frequency is the same as the first frequency, in a case that the first signal was generated from a first bit sequence, and the second signal was generated from the first bit sequence, and
the mapping section is configured to set such that the first frequency is different from the second frequency, in a case that the first signal was generated from the first bit sequence, and the second signal was generated from a second bit sequence different from the first bit sequence.

11. A communication system comprising a terminal apparatus and a base station apparatus, wherein
the terminal apparatus comprises:
first and second transmission antennas; and
a transmission processing section configured to transmit a first signal by a first frequency, and transmit a second signal by a second frequency, and the base station apparatus comprises:
an allocation information generation section configured to generate frequency allocation information, the frequency allocation information being used by the terminal apparatus in a case that the first and second signals are allocated to the first and second frequencies; and
a transmission section configured to transmit, to the terminal apparatus, the frequency allocation information generated by the allocation information generation section,
wherein the allocation information generation section is configured to generate the frequency allocation information such that the second frequency is the same as the first frequency, in a case that the first signal was generated from a first bit sequence, and the second signal was generated from the first bit sequence, and
the allocation information generation section is configured to generate the frequency allocation information such that the second frequency is different from the first frequency, in a case that the first signal was generated from the first bit sequence, and the second signal was generated from second bit sequence different from the first bit sequence.

* * * * *